United States Patent [19]

Bhatnagar

[11] 4,388,581

[45] Jun. 14, 1983

[54] DYNAMOELECTRIC MACHINE

[75] Inventor: Har S. Bhatnagar, Fort Wayne, Ind.

[73] Assignee: General Electric Company, Fort Wayne, Ind.

[21] Appl. No.: 264,821

[22] Filed: May 18, 1981

[51] Int. Cl.³ .............................................. H02P 1/44
[52] U.S. Cl. ................................... 318/789; 318/793; 318/772
[58] Field of Search ........................ 318/772, 789–790, 318/793

[56] References Cited

U.S. PATENT DOCUMENTS

| | | | |
|---|---|---|---|
| 3,097,331 | 7/1963 | Miller | 318/772 |
| 3,110,852 | 11/1963 | Brucken | 318/772 |
| 4,030,009 | 6/1977 | Halsted | 318/772 |
| 4,313,076 | 1/1982 | Rathje | 318/790 |
| 4,348,626 | 9/1982 | London | 318/772 |

*Primary Examiner*—J. V. Truhe
*Assistant Examiner*—Patrick C. Keane
*Attorney, Agent, or Firm*—Joseph E. Papin

[57] ABSTRACT

A dynamoelectric machine has only a pair of line terminals adapted for selective connection across a single phase power source and is operable to be started in a split-phase mode, to run at a predetermined low speed in a single phase mode, and to run at a predetermined high speed generally in a two phase mode.

13 Claims, 4 Drawing Figures

DYNAMOELECTRIC MACHINE

FIELD OF THE INVENTION

This invention relates in general to dynamoelectric machines and in particular to those which may be selectively energized at two different speeds.

BACKGROUND OF THE INVENTION

In the past, various different schemes have been utilized to effect multi-speed operation of a dynamoelectric machine, such as a single phase alternating current motor or the like. For instance, some of the past multi-speed electric motors were provided with a ferromagnetic stator having two sets of different winding poles; therefore, one set of winding poles was selectively excited to effect the energization of the electric motor at one predetermined speed, and the other set of winding poles was selectively energized to effect the energization of the electric motor at another different predetermined speed. For example, in an electric motor with a stator having both a two pole and a four pole winding configuration, the synchronous speed of the electric motor when the four pole winding configuration was excited was about one-half the synchronous speed of such electric motor when its two pole winding configuration was excited.

Another past multi-speed electric motor scheme is disclosed in U.S. Pat. No. 4,030,009 issued June 14, 1977 to Halsted. In this scheme, a double-pole double-throw line switch and first and second relays were utilized to control the excitation of a low speed run winding, a high speed run winding and start windings in order to attain two speed energization of the electric motor. As the aforementioned Halsted patent is understood, the first relay placed the start winding in parallel combination with the high speed run winding until the voltage across the high speed run winding became high enough to effect the actuation of the first relay when the electric motor was initially energized by manual operation of the line switch across a power source. Upon this actuation of the first relay, the start winding was switched out of the circuit, and the electric motor thereafter ran on its high speed run windings alone. When the electric motor was operated at its low speed, the second relay placed the high speed run winding and a part of the start winding in a parallel combination with the low speed run winding. As the voltage across the low speed winding attained a predetermined value, the second relay was actuated to switch both the high speed run winding and the start winding part out of circuit with the low speed run winding, and the electric motor was thereafter energized to run on the low speed run winding alone. One of the disadvantageous or undesirable features of this past two speed motor scheme is believed to be the cost involved in utilizing two relays as well as a double-pole double-throw switch to effect the two speed energization of the motor. Further, another disadvantageous or undesirable feature of this past two speed motor scheme is believed to be that the speed sensing capabilities of the two relays inferred from the voltage across the low or high speed run windings might provide imprecise switching points for switching out the start winding.

Still another past multi-speed electric motor scheme is disclosed in U.S. Pat. No. 3,097,331 issued July 9, 1963 to J. V. Miller. As this patent is understood, one of the two speeds at which the motor may be energized was selected upon the manual operation of a single-pole single-throw line switch to place the motor across a power source. After a centrifugal switch of the motor was actuated to a pair of back contacts thereof to effect the energization of the motor at one of the two speeds thereof, the single-pole single-throw switch was again manually operated to cause a momentary interruption of the energization of the motor across the power source, and such momentary power interruption effected the actuation of a relay so as to establish the energization of the motor at the other of the two speeds thereof. One of the disadvantageous or undesirable features of this another past motor is believed to be that such motor might only be suitable for low torque applications. For instance, if the motor was first energized to its low speed, the start winding was employed to accelerate the motor from its at-rest or standstill condition to such low speed. However, when the high speed was later selected, the high speed run winding alone was available to provide the additional torque necessary to effect the acceleration of the motor from its low speed to its high speed. As is well known, some motors exhibit relatively low torque when running at a speed that is substantially different than their synchronous speed as dictated by their number of poles, and such might be the case when the high speed run winding is depended upon to effect the acceleration of a motor from its low speed to its high speed, as discussed above. Another disadvantageous or undesirable feature of the above discussed another past motor is believed to be that the start windings thereof are not utilized during the running energization of such motor so as to add torque thereto.

SUMMARY OF THE INVENTION

Among the several objects of the present invention may be noted the provision of an improved dynamoelectric machine which overcomes the disadvantageous or undesirable features discussed hereinabove, as well as others, with respect to the prior art; the provision of such improved dynamoelectric machine operable at two speeds when energized across a single phase power source and energized generally in the fashion of a two-phase machine at one of its speeds to effect increased efficiency; the provision of such improved dynamoelectric machine which is started as a split-phase machine, energized at a predetermined low speed as a single phase machine, and also energized at a predetermined high speed generally in a two phase mode; the provision of such improved dynamoelectric machine having a permanently connected parallel winding circuit combination including a high speed main winding means connected across a series combination of a phase shift capacitor and a pair of series connected auxiliary winding sections, the parallel winding circuit combination being excited to effect the predetermined high speed energization of the dynamoelectric machine and only the high speed main winding means and one of the auxiliary winding sections being excited during a starting energization of the dynamoelectric machine; and the provision of such improved dynamoelectric machine in which the components thereof are simplistic in design, economically manufactured and easily assembled. These as well as other objects and advantageous features of the present invention will be in part apparent and in part pointed out hereinafter.

In general, a dynamoelectric machine in one form of the invention is adapted for selective energization of a predetermined low speed and at a predetermined high speed across a power source. The dynamoelectric machine has a winding circuit including a low speed main winding means for excitation to effect the energization of the dynamoelectric machine at the predetermined low speed thereof and also including a parallel winding combination of a high speed main winding means and auxiliary winding means at least in part adapted for conjoint excitation to effect a starting energization of the dynamoelectric machine and also the energization thereof at the predetermined high speed. A pair of switch means are provided for translation between a pair of switching modes thereof, respectively, to control the winding circuit, and one of the switch means is translated in response to dynamoelectric machine speed. In one of their switching modes, the switch means pair effect the excitation of the high speed main winding means and only a part of the auxiliary winding means in the parallel winding combination upon the initial starting energization of the dynamoelectric machine across the power source, and the one switch means is translated from its one switching mode effecting the deexcitation of the parallel winding combination into the other of its switching modes to effect the excitation of the low speed main winding means and the energization of the dynamoelectric machine at its predetermined low speed generally as such predetermined low speed is attained in response to the initial starting energization of the dynamoelectric machine. The one switch means is also translated from its other switching mode effecting the deexcitation of the low speed main winding means upon the occurrence of a preselected momentary deenergization of the dynamoelectric machine across the power source reducing the speed of the dynamoelectric machine below the predetermined low speed. The other switch means is also translated from its one switching mode into the other of its switching modes upon the occurrence of the preselected momentary deenergization of the dynamoelectric machine across the power source thereby to effect the excitation of the entire parallel winding combination and the energization of the dynamoelectric machine at the predetermined high speed thereof when the dynamoelectric machine is reenergized across the power source subsequent to the momentary interruption of the dynamoelectric machine energization.

Further in general and in one form of the invention, a dynamoelectric machine is adapted for selective energization at a predetermined low speed and at a predetermined high speed across a power source. The dynamoelectric machine has a low speed running winding, a high speed running winding, and a centrifugal switch means is operable generally for switching between a first position and a second position. Relay means is adapted for operation in an energized condition and a deenergized condition, and a first auxiliary winding is operative when energized in parallel with one of the low and high speed running windings to accelerate the dynamoelectric machine to at least the predetermined low speed thereof. Means is provided for connecting the first auxiliary winding and a second auxiliary winding in a series combination with each other and in a parallel combination with the high speed running winding, and the parellel combination is effective when energized to accelerate the dynamoelectric machine from its predetermined low speed to its predetermined high speed. Means is provided for placing the relay means in its energized condition when the dynamoelectric machine is initially started across the power source, and means is associated with the relay means for maintaining the relay means in its energized condition after being placed therein upon the initial starting of the dynamoelectric machine across the power source when the centrifugal switch is in its first position, the centrifugal switch being operative in its second position to energize the low speed running winding. Means is provided for disabling the placing means when the centrifugal switch is in its second position, and means is operable generally in the event of the occurrence of a preselected momentary interruption of the energization of the dynamoelectric machine across the power source when the centrifugal switch is in its second position for effecting the deenergization of the relay means, the relay means being effective in its deenergized condition to deenergize the low speed running winding and to energize the parallel combination whereby the dynamoelectric machine is energized to its predetermined high speed.

BRIEF DESCRIPTION OF THE DRAWINGS

Corresponding reference characters indicate corresponding parts throughout the several views of the drawings.

The exemplifications set out herein illustrate the preferred embodiment of the present invention in one form thereof, and such exemplifications are not to be construed as limiting in any manner the scope of such invention.

DETAILED DESCRIPTION OF THE PREFERRED EMBODIMENT

Figure 1:
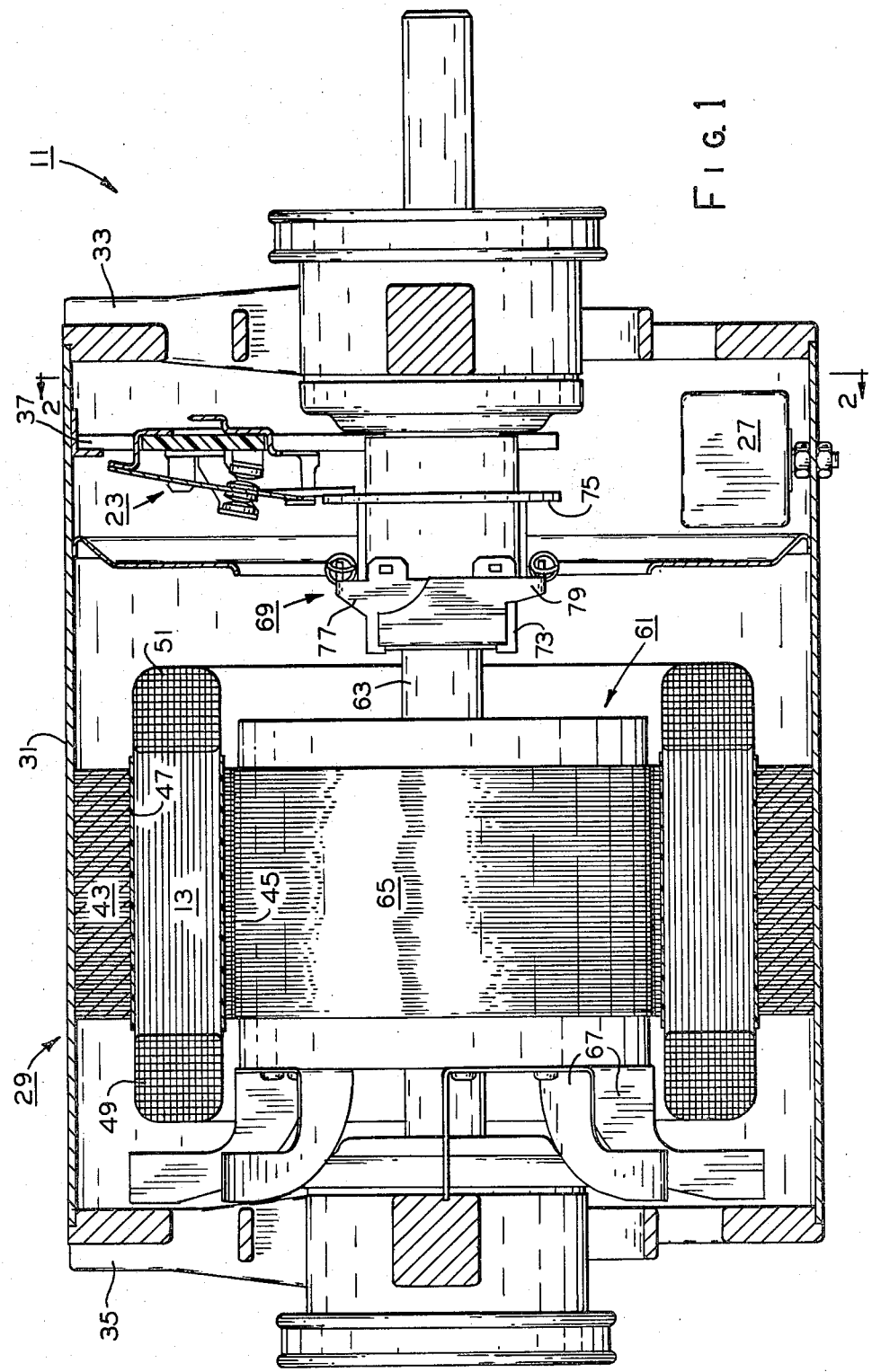
FIG. 1 is a sectional view illustrating a dynamoelectric machine in one form of the invention in cross section.
Figure 2:
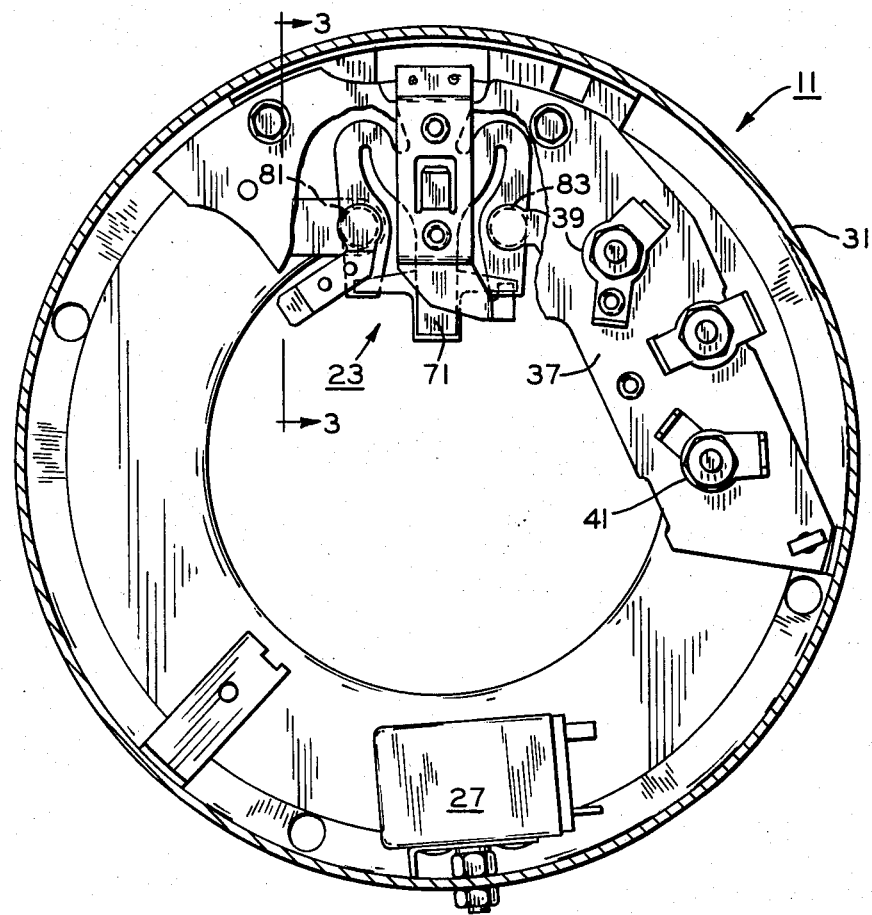
FIG. 2 is a sectional view taken along line 2—2 in FIG. 1.
Figure 3:
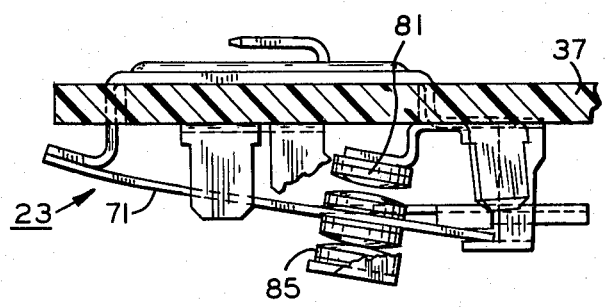
FIG. 3 is a sectional view taken along line 3—3 in FIG. 2.
Figure 4:
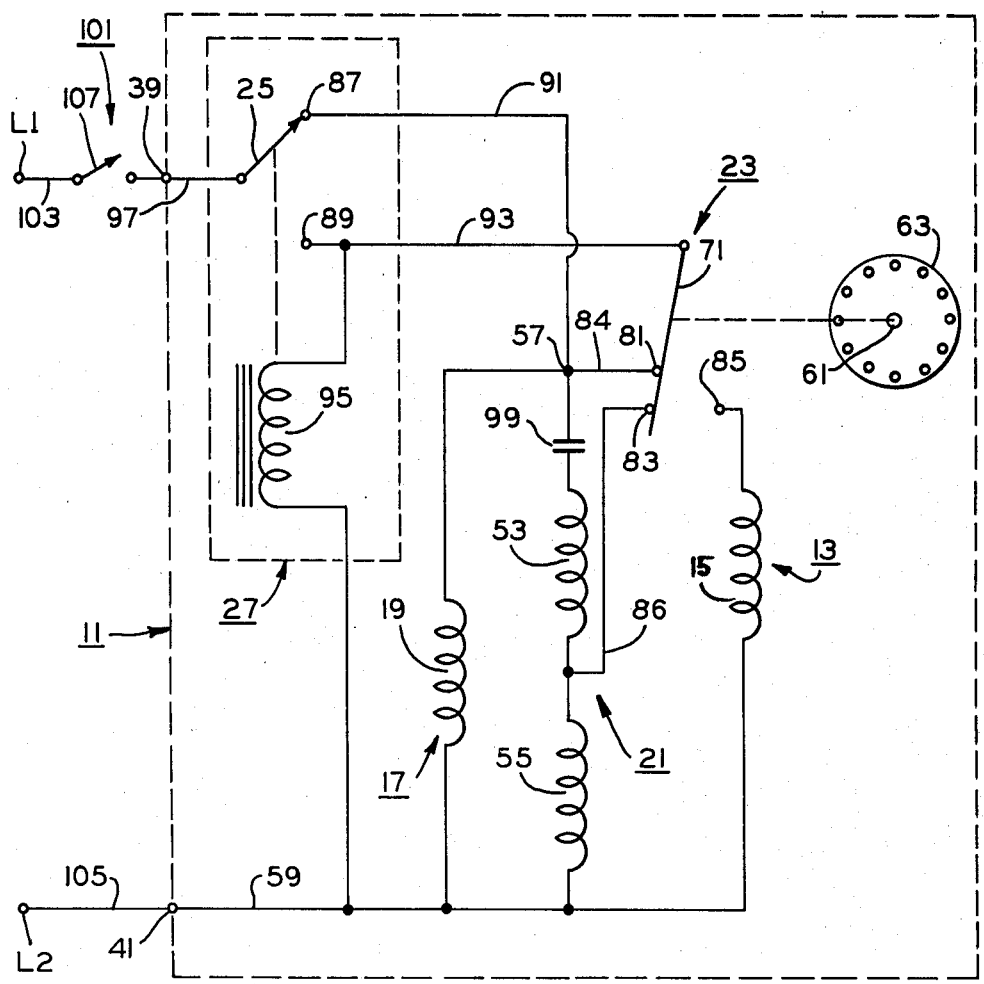
FIG. 4 is a schematic diagram of the circuitry of the dynamoelectric machine of FIG. 1 and illustrating its selective connection across a power source.

Referring now to the drawings in general, there is shown a dynamoelectric machine 11 in one form of the invention adapted for selective energization at a predetermined low speed and a predetermined high speed across a single phase power source designated by line terminals L1, L2 (FIG. 4). Dynamoelectric machine 11 has a winding circuit indicated generally at 13 which includes a low speed main winding or winding means 15 for excitation to effect the energization of the dynamoelectric machine at the predetermined low speed thereof, and the winding circuit also includes a parallel winding circuit combination 17 of a high speed main winding or winding means 19 connected across an auxiliary winding or winding means, indicated generally at 21, for selective excitation to effect both a starting or start-up energization of the dynamoelectric machine and the energization thereof at the predetermined high speed (FIGS. 1 and 4). A pair of switch means, such as for instance a centrifugal switch 23 and a magnetically operated switch or switch member 25 of a relay 27 or the like, are adapted for translation or otherwise arranged so as to be movable or operable between a pair of switching modes or positions, and of course, switch means or centrifugal switch 23 is translated in response to dynamoelectric machine speed (FIGS. 1-4). In one of their respective switching positions, centrifugal switch 23 and relay switch 25 effect the excitation of only high speed main winding means 19 and a part 55 of auxiliary winding means 21 in parallel winding combination 17 upon the initial starting energization of dynamoelectric machine 11 across power source L1, L2, and the centrifugal switch is translated from its one switching position effecting the deexcitation of the parallel winding combination into the other of its switching modes to effect the excitation of low speed main winding 15 and the energization of the dynamoelectric machine at the predetermined low speed thereof generally as the predetermined low speed is attained in response to the initial starting energization of the dynamoelectric machine (FIG. 4). Centrifugal switch 23 is also movable from its other switching position effecting the deexcitation of low speed main winding 15 upon the occurrence of a preselected momentary deenergization of dynamoelectric machine 11 across power source L1, L2 which reduces the speed of the dynamoelectric machine below the predetermined low speed (FIG. 4). Relay switch 25 is also movable from its one switching position to the other switching position thereof upon the occurrence of the aforementioned preselected momentary deenergization of dynamoelectric machine 11 across power source L1, L2 thereby to effect the excitation of the entire parallel winding combination 17 and the energization of the dynamoelectric machine at the predetermined high speed thereof when the dynamoelectric machine is re-energized across the power source subsequent to the preselected momentary interruption of the dynamoelectric machine energization (FIG. 4).

More particularly and with specific reference to FIGS. 1-4, dynamoelectric machine 11 is provided with a housing or housing means 29 including a generally cylindric shell 31 having a pair of enclosing opposite end plates 33, 35 mounted by suitable means, such as plurality of through bolts or the like for instance (not shown), to the opposite ends of the shell. While housing 29 is illustrated herein for purposes of disclosure, it is contemplated that other housings having different configurations may be utilized within the scope of the invention so as to meet at least some of the objects thereof. Means, such as for instance a terminal board 37 or the like, for supporting or otherwise mounting centrifugally actuated switch 23, is positioned within shell 31 generally adjacent end plate 33 by suitable means, and a pair of line connection terminals or terminal means 39, 41 are also fixedly secured to the supporting means or terminal board extending therethrough so as to be easily accessible from exteriorly of dynamoelectric machine housing 29 for quick connection with line leads or the like, as discussed hereinafter. Relay 27 is also supported within housing 29 generally adjacent end plate 33 by suitable means, and the relay may be a model K10P-4043 available from the Potter and Brumfield Co., Princeton, Ind. Albeit not shown, means, such as overload protectors or the like for instance, may also be mounted on terminal board 37 and connected in circuit relation with low speed main winding 15 and the parallel winding circuit combination 17, respectively, within the scope of the invention so as to meet at least some of the objects thereof.

A stationary assembly, such as a ferromagnetic core or stator 43 for instance, is fixedly located within shell 31 between end plates 33, 35 in spaced relation with terminal board 37. A bore 45 is axially provided through stationary assembly or stator 43, and means, such as for instance a plurality of slots 47 or the like, for receiving the windings of winding circuit 13 are also axially provided through the stator generally about the bore and intersecting therewith.

Low speed main winding 15, high speed main winding 19 and auxiliary winding 21 are each provided with a preselected number of coils having a preselected plurality of turns, and such turns each include opposite side portions which are disposed within stator slots 47 and opposite end portions which form opposite generally annular groupings of end turns 49, 51 disposed generally radially outwardly of stator bore 45 adjacent the opposite end faces of the stator. Albeit not shown, the poles of high speed main winding 19 and auxiliary winding 21 are preferably arranged in quadrature with each other, and it is contemplated that the windings of winding circuit 13 may be provided with any desired number of poles dependent upon the dynamoelectric machine speeds desired within the scope of the invention so as to meet at least some of the objects thereof. Furthermore, it may be noted that auxiliary winding 21 comprises a pair of winding sections 53, 55 which are connected together in a series combination or in series circuit relation with each other, as best seen in FIG. 4, and while the winding section pair are preferably bifiler wound, it is contemplated that the auxiliary windings may be provided with other winding configurations within the scope of the invention so as to meet at least some of the objects thereof. With one of the opposite sides of winding sections 53, 55 interconnected in series, as discussed above, the other of the opposite sides of winding section 53 is interconnected with the one of the opposite sides of high speed main winding 19 at a circuit junction 57, and a lead 59 is connected between one of the opposite sides of low speed main winding 15, the other of the opposite sides of high speed main winding 17, and the other of the opposite sides of winding section 55 of auxiliary winding 21. Thus, it may be noted that the aforementioned parallel winding circuit combination 17 is permanently connected in winding circuit 13.

A rotatable assembly 61 includes a motor shaft 63 having a ferromagnetic rotor 65 mounted thereon for conjoint rotation, and the rotor may be of the conventional squirrel-cage type, if desired. Shaft 63 extends generally axially through bore 45 of stator 43 so as to be rotatably journaled by suitable means associated with opposite end plates 33, 35, and rotor 65 is disposed at least in part with the stator bore so as to be arranged in magnetic coupling relation with the stator upon the energization of dynamoelectric machine 11. A plurality of fan blades 67 are connected by suitable means, such as screws or rivets or the like for instance, with the opposite ends of rotor 65 so as to be conjointly rotatable therewith, and upon such rotation, the fan blades circulate air in cooling relation over at least end turn groupings 49 of the windings in winding circuit 13. While fan blades 67 are illustrated herein as being mechanically connected with rotor 65, it is contemplated that other fan blades having various other configurations may be integrally formed or otherwise casted as a part of the opposite end rings provided in the squirrel-cage winding of the rotor within the scope of the invention so as to meet at least some of the objects thereof.

Centrifugal switch 23 comprises a switch actuating mechanism or device 69 which is conjointly rotatable with rotatable assembly 61 upon energization of dynamoelectric machine 11 to effect the translation, movement or operation of a switch element, such as a resilient or resiliently urged current carrying switch member or blade 71 for instance, between the aforementioned pair of switching modes or positions for controlling the excitation of winding circuit 13, as discussed in greater detail hereinafter and as best seen in FIGS. 1, 3 and 4. Switch actuating mechanism 69 includes a hub 73 fixedly located on shaft 63 for conjoint rotation herewith, and a push collar 75 disposed about the hub and shaft is axially movable with respect thereto between an at-rest position and an axially displaced position. A pair of spring loaded centrifugal weight members 77, 79 are operable in response to the rotational speed of rotatable assembly 61 to effect the axial movement of push collar 75 between its opposite at-rest and displaced positions. In its at-rest position, push collar 75 engages switch blade 71 which is pivotally mounted or otherwise movably arranged on terminal board 37 and urges the switch blade into making engagement with a pair of cooperating contacts 81, 83 also carried on the terminal board, and in its displaced position, the push collar permits movement of the switch blade into making engagement with another or a spaced contact 85 also carried on the terminal board in spaced relation with contact pair 81, 83. Connection means, such as leads 84, 86, are respectively connected between contact 81 and circuit junction 57 and between contact 83 and the midpoint of the series combination of winding sections 53, 55 of auxiliary winding 21, and contact 85 is connected with the other of the opposite sides of low speed run winding 15, as best seen in FIG. 4. While centrifugal switch 23 is illustrated herein for purposes of disclosure, it is contemplated that various other types of centrifugal switches having different mountings and different operations may be utilized in dynamoelectric machine 11 within the scope of the invention so as to meet at least some of the objects thereof.

Relay 27 includes a pair of contacts, such as a normally closed contact 87 and a normally open contact 89, and magnetically operated switch 25, such as a resiliently urged current carrying switch member or switch blade for instance, of the relay resiliently urged toward a switching mode or at-rest position in making engagement with relay contact 87. Relay contact 87 is connected by a lead 91 with circuit junction 57 in winding circuit 13, and relay contact 89 is connected by another lead 93 in circuit relation with switch blade 71 of centrifugal switch 23. Relay 27 is also provided with a coil 95 which is adapted for magnetic coupling or holding relation with relay switch 25 and also connected in circuit relation between relay contact 89 and lead 59 which is connected with terminal 41 on terminal board 37 of dynamoelectric machine 11. Thus, upon energization of relay coil 95, switch 25 is magnetically attracted or otherwise translated or moved from its switching mode or position engaged with contact 87 into its other switching mode or position engaged with contact 89. To complete the description of dynamoelectric machine 11, another lead 97 is interposed between dynamoelectric machine terminal 39 and relay switch 25, and a run capacitor 99 is permanently connected in parallel winding circuit combination 17 in series between circuit junction 57 and winding sections 53 of auxiliary winding 21.

As illustrated in an exemplary circuit for connecting dynamoelectric machine 11 across power source or line terminals L1, L2, a pair of circuit leads 103, 105 are connected between dynamoelectric machine terminals 39, 41 and line terminals L1, L2, respectively, and an on-off type line switch, such as a single-pole single-throw switch or external switch device 107, is interposed in lead 103 with the line switch being manually operable to effect the energization of the dynamoelectric machine across the power source.

OPERATION

With the components of dynamoelectric machine 11 positioned as illustrated in FIG. 4, line switch 107 may be manually closed by an operator which connects terminals 39, 41 of the dynamoelectric machine across line terminals L1, L2 thereby to effect an initial starting energization of the dynamoelectric machine across the power source. When switch blade 71 of centrifugal switch 23 is made with contact pair 81, 83 thereof, relay coil 95 is connected directly across dynamoelectric machine terminals 39, 41 upon the initial starting energization of dynamoelectric machine 11; therefore, the relay coil is immediately energized or excited and magnetically attracts relay switch 25 from its switching position engaged with relay contact 87 into its other switching position in making engagement with relay contact 89. The circuit or means for effecting the excitation or actuation of relay coil 95 may be traced from dynamoelectric machine terminal 39 through lead 97, relay switch 25 and contact 87, lead 91, circuit junction 57, contact 81 and switch blade 71 of centrifugal switch 23, lead 93, relay contact 89, relay coil 95, and lead 59 to dynamoelectric machine terminal 11.

Upon the aforementioned switching operation of relay switch 25 into making engagement with relay contact 89, relay coil 95 remains excited across dynamoelectric machine terminals 39, 41 through lead 97, the engagement of relay switch 25 with relay contact 89 and lead 59 without employing the components of centrifugal switch 23 which were utilized to effect the initial excitation of the relay coil. With relay switch 25 so engaged with relay contact 89, current flows therefrom through lead 93, switch blade 71 of centrifugal switch 23 in making engagement with contact pair 81, 83 thereof, lead 86, and therefrom through only high speed main winding 19 and winding section 55 of auxiliary winding means 21 in parallel winding combination 17 to lead 59 and dynamoelectric machine terminal 41. Thus, it may be noted that only winding section 55 of auxiliary winding 21 and high speed main winding 19 of the parallel combination 17 are excited so that dynamoelectric machine is initially started up or energized as a split-phase machine across line terminals L1, L2 thereby to afford adequate torque to effect acceleration of rotor 65 from its at-rest or standstill condition to the desired or preselected speed therefor, as discussed hereinafter. In other words, when switch blade 71 is engaged with contact pair 81, 83 of centrifugal switch 23, capacitor 99 and winding section 53 of auxiliary winding means 21 are short-circuited. Due to the magnetic coupling relationship between stator 43 and rotor 65 of dynamoelectric machine 11, rotation of the rotor is induced in response to the start-up excitation of parallel winding combination 17. Generally as rotor 65 attains the aforementioned preselected or predetermined low speed or low synchronous speed of dynamoelectric machine 11, spring loaded weight members 77, 79 are actuated centrifugally effecting the axial movement of push collar 75 from its at-rest position to its axially displaced position on motor shaft 63. Switch blade 71 of centrifugal switch 23 follows or is urged into following relation with push collar 75 towards its displaced position, and such movement of the switch blade effects its disengagement from contact pair 81, 83 of the centrifugal switch and the subsequent engagement of the switch blade with spaced contact 85 of the centrifugal switch. Of course, the disengagement of switch blade 71 from contact pair 81, 83 effects the deexcitation of high speed main winding 19 and winding section 55 of auxiliary winding 21 in the parallel winding circuit combination 17 across dynamoelectric machine terminals 39, 41 thereby to terminate the initial starting energization of dynamoelectric machine 11, and upon the subsequent engagement of switch blade 71 with spaced contact 85 of centrifugal switch 23, low speed main winding 15 becomes excited across dynamoelectric machine terminals 39, 41. With low speed run winding 15 so excited, current flows from dynamoelectric machine terminal 9, through lead 97, relay switch 25 engaged with relay terminal 89, lead 93, switch blade 71 engaged with spaced contact 85 of centrifugal switch 23, low speed run winding 15 and lead 59 to dynamoelectric machine terminal 41. Thus, with low speed, main winding 15 so excited, dynamoelectric machine 11 is energized at the predetermined low speed thereof as a single phase machine across line terminals L1, L2.

In the event it may be subsequently desired to change the energization of dynamoelectric machine from the predetermined low speed to the predetermined high speed thereof, line switch 107 may be manually actuated by the operator to effect the occurrence of the preselected momentary interruption of the energization of the dynamoelectric machine across line terminals L1, L2. This momentary deenergization of dynamoelectric machine 11 may occur for a time period at least long enough to effect the reduction of the speed of rotor 65 to a value less than the predetermined low speed of the dynamoelectric machine which was attained in response to the excitation of low speed main winding 15, as discussed hereinabove. Of course, when line switch 107 is opened to effect the momentary deenergization of dynamoelectric machine 11, the aforementioned reduction in the speed of rotor 65 causes the spring loaded weight members 77, 79 of centrifugal switch actuating member 69 to return from the aforementioned centrifugally displaced positions thereof toward their at-rest positions, and in response to the return movement of the spring loaded spring member, the push collar 75 is axially driven from its displaced position toward its at-rest position. This axial return movement of push collar 75 along motor shaft 63 serves to conjointly move switch blade 71 of centrifugal switch 23 from the engagement thereof with spaced contact 85 toward contact pair 81, 83, and upon such disengagement of switch blade 71 from spaced contact 85, the deexcitation of low speed main winding 15 across dynamoelectric machine terminals 39, 41 is effected. The aforementioned momentary opening of line switch 107 also causes the deexcitation of relay coil 95 across dynamoelectric machine terminals 39, 41 which, of course, interrupts the magnetic holding relation of the relay coil with relay switch 25 so that the relay switch is resiliently returned to its switching position remaking with relay contact 87 and breaking from relay contact 89. With relay switch 25 and relay contact 87 so remade, the parallel winding combination 17 of high speed main winding 19 and winding sections 53, 55 of auxiliary winding 21 along with capacitor 99 is reconnected in circuit relation across dynamoelectric machine terminals 39, 41. Thereafter, when the operator manually recloses line switch 107 thereby to terminate the momentary interruption of the energization of dynamoelectric machine 11 across line terminals L1, L2 and effect the reenergization of the dynamoelectric machine thereacross, current again flows from dynamoelectric machine terminal 39 through lead 97, relay switch 25 engaged with relay contact 87, lead 91, the parallel winding combination of high speed main winding 19 and winding sections 53, 55 of auxiliary winding 21 along with capacitor 99 and therefrom through lead 59 to dynamoelectric machine terminal 49. Upon this reexcitation of high speed main winding 19 and auxiliary winding 21 along with run capacitor 99, dynamoelectric machine is energized at the predetermined high speed thereof generally as a two phase machine across single phase power source or line terminals L1, L2. In other words, capacitor 99 shifts the phase of the current fed to auxiliary winding 21 by approximately ninety degrees (90°) with respect to that fed to high speed main winding 19 so that dynamoelectric machine 11 operates generally as a two phase machine when energized at the predetermined high speed thereof. Of course, when dynamoelectric machine 11 is so energized at the predetermined high speed thereof, centrifugal switch 23 is actuated as discussed above so as to remake switch blade 71 with contact 85, but low speed main winding 15 remains deexcited since relay switch 25 is disengaged from relay contact 89 thereby to open circuit the low speed run winding across dynamoelectric machine terminals 39, 41.

In order to change the energization of dynamoelectric machine 11 from the predetermined high speed to the predetermined low speed thereof, line switch 107 may again be manually operated to again effect the occurrence of the preselected momentary interruption of the energization of the dynamoelectric machine across line terminals L1, L2. This momentary deenergization of dynamoelectric machine 11 again effects the reduction of the speed of rotor 65 to a value at which switch blade 71 of centrifugal switch 23 is actuated to reengage contact pair 81, 83 to thereby short circuit winding section 53 of auxiliary winding 21 and capacitor 99 and provide the circuit path through which relay coil 95 may again be excited, as previously discussed. Upon the reclosure of line switch 107, relay coil 95 is, of course, reexcited to effect the reenergization of dynamoelectric machine 11 at the predetermined low speed thereof, as previously described.

From the foregoing, it is now apparent that a novel dynamoelectric machine 11 is presented meeting the objects and advantageous features set out hereinbefore, as well as others, and it is contemplated that changes as to the precise arrangements, shapes, details and connections of the components of the dynamoelectric machine may be made by those having ordinary skill in the art without departing from the spirit of the invention or the scope thereof as set out in the claims which follow.

What I claim as new and desire to secure by Letters Patent of the United States is:

1. A dynamoelectric machine adapted for energization at a predetermined low speed in a single phase mode and for energization at a predetermined high speed generally in a two phase mode across a single phase power source in response to selective manual operation of a line switch adapted for connection in circuit relation between the dynamoelectric machine and the power source, the dynamoelectric machine comprising:

a housing including a pair of opposite end plates;

a terminal board supported on said housing at least generally adjacent one of said end plates and including a pair of terminal means adapted for respective connection with the power source;

a ferromagnetic stator arranged with said housing between said end plates and spaced from said terminal board, said stator including a bore, and a plurality of winding receiving slots;

a winding circuit disposed in at least some of said slots of said stator and including auxiliary winding means having a first winding section and a second winding section with one side of each of said first and second sections connected together in series circuit relation, a low speed main winding means, a high speed main winding means, the other side of said first winding section and one side of each of said low speed main winding means and said high speed main winding means being connected with one of said terminal means, the other side of each of said high speed main winding means and said second winding section being connected with each other at a circuit junction, and a capacitor connected between said circuit junction and the other side of said second winding section wherein said high speed run winding means, said first and second sections of said auxiliary winding means and said capacitor defines a permanently interconnected parallel winding circuit combination;

a rotatable shaft extending through said bore of said stator and rotatably journaled in said opposite end plates;

a rotor on said shaft conjointly rotatable therewith and disposed at least in part within said bore of said stator so as to be arranged in magnetic coupling relation therewith upon the energization of the dynamoelectric machine;

a relay disposed at least in part within said housing and including first and second contacts, said first contact being connected with said parallel winding circuit combination at said circuit junction, coil means connected between said second contact and said one terminal means of said terminal board and adapted for excitation upon the energization of the dynamoelectric machine across the power source, a first switch member urged toward making engagement with said first contact and associated in magnetic coupling relation with said coil means, said first switch member being movable to break from said first contact and make with said second contact upon the excitation of said coil means;

a centrifugal switch actuating mechanism supported on at least one of said rotor and said shaft so as to be conjointly rotatable therewith and having a push collar disposed about said shaft, said centrifugal switch actuating mechanism being operable generally in response to rotation of said rotor upon the enegization of the dynamoelectric machine to move said push collar between an at-rest position and an axially displaced position thereof with respect to said shaft; and switch means for at least in part controlling said winding circuit and supported on said terminal board, said switch means including third, fourth, and fifth contacts, said third contact being connected with said circuit junction, said fourth contact being connected with said first and second winding sections of said auxiliary winding means between the one sides thereof, respectively, said fifth contact being connected with the other side of said low speed main winding means, a second switch member arranged generally in driven relation with said push collar of said centrifugal switch actuating mechanism and urged toward making engagement with both of said third and fourth contacts when said push collar is in its at-rest position, and said second switch member being connected in circuit relation with said second contact of said relay, said first switch member being magnetically attracted from said first contact into making engagement with said second contact in response to the excitation of said coil means of said relay when the line switch is manually operated to initially effect starting excitation of only said high speed main winding means and said second winding section of said auxiliary winding means in said parallel winding circuit combination when said push collar is in its at-rest position with said second switch member in making engagement with both of said third and fourth contacts so as to effect split-phase starting energization of the dynamoelectric machine, said push collar being movable from its at-rest position to its axially displaced position in response to the operation of said centrifugal switch operating mechanism generally as said rotor attains the preselected low speed in response to the split-phase starting energization of the dynamoelectric machine with the movement of said push collar driving said second switch member from both said third and fourth contacts terminating the split-phase starting energization of the dynamoelectric machine and into making engagement with said fifth contact exciting said low speed main winding means so as to effect the single phase energization at the predetermined low speed of the dynamoelectric machine across the power source, said first switch member thereafter returning from said second contact to remake with said first contact in response to the deexcitation of said coil means of said relay in the event of the manual operation of the line switch to effect a preselected momentary deenergization of the dynamoelectric machine across the power source reducing the rotational speed of said rotor and said centrifugal switch operating mechanism below the predetermined low speed so as to effect return movement of said push collar from its displaced position toward its at-rest position and the disengagement of said second switch member from said fifth contact to deexcite said low speed main winding means, and said parallel winding circuit combination being subsequently excited when the line switch is again manually operated to reconnect the dynamoelectric machine across the power source and effect the reenergization of the dynamoelectric machine generally in the two phase mode thereof at the predetermined high speed.

2. A dynamoelectric machine adapted for selective energization at a predetermined low speed and at a predetermined high speed across a single phase power source, the dynamoelectric machine comprising:

a winding circuit including a low speed main winding means for excitation to effect the energization of the dynamoelectric machine at the predetermined low speed thereof, and a parallel winding circuit combination of a high speed main winding means and auxiliary winding means for conjoint excitation to effect both a starting energization of the dynamoelectric machine and the energization thereof at the predetermined high speed;

a pair of switch means for translation, between a pair of switching modes thereof, respectively, to control said winding circuit and with one of said switch means being translated in response to dynamoelectric machine speed, said switch means pair in one of the respective switching modes thereof effecting the excitation of said high speed winding means and a part of said auxiliary winding means in said parallel winding circuit combination upon initial starting energization of the dynamoelectric machine across the power source and said one switch means being translated from its one switching mode effecting the deexcitation of said parallel winding circuit combination into the other of its switching modes to effect the excitation of said low speed main winding means and the energization of the dynamoelectric machine at the predetermined low speed thereof generally as the predetermined low speed is attained in response to the initial starting energization of the dynamoelectric machine, said one switch means also being translated from its other switching mode effecting the deexcitation of said low speed main winding means upon the occurrence of a preselected momentary deenergization of the dynamoelectric machine across the power source reducing the speed of the dynamoelectric machine below the predetermined low speed, and said other switch means also being translated from its one switching mode into the other of its switching modes upon the occurrence of the preselected momentary deenergization of the dynamoelectric machine across the power source thereby to effect the excitation of said parallel winding circuit combination and the energization of the dynamoelectric machine at the predetermined high speed thereof when the dynamoelectric machine is reenergized across the power source subsequent to the preselected momentary interruption of the dynamoelectric machine energization.

3. A dynamoelectric machine as set forth in claim 2 wherein said parallel winding circuit combination includes a capacitor connected in series circuit relation with said auxiliary winding means so as to effect the predetermined high speed energization of the dynamoelectric machine generally in two phase mode across the single phase power source.

4. A dynamoelectric machine as set forth in claim 2 wherein said parallel winding circuit combination is permanently interconnected and includes a capacitor in series with said auxiliary winding means.

5. A dynamoelectric machine as set forth in claim 2 wherein said auxiliary winding means includes a pair of winding sections connected in series circuit relation, one of said winding sections comprising said auxiliary winding part.

6. A dynamoelectric machine as set forth in claim 5 further comprising means connected between said winding sections and adapted for connection in circuit relation with said one switch means when in its one switching mode.

7. A dynamoelectric machine adapted for selective energization at a predetermined low speed and at a predetermined high speed across a single phase power source, the dynamoelectric machine comprising:

centrifugal switch means operable generally in response to dynamoelectric machine speed for switching from a first position to a second position when the dynamoelectric machine is energized at least to the predetermined low speed thereof across the power source;

relay means for operation between an excited condition effected when said centrifugal switch means is in its first position and a deexcited condition when said centrifugal switch is in its second position;

a parallel winding circuit combination including a high speed main winding means permanently connected across a series combination of an auxiliary winding means and a phase shift capacitor with only said high speed main winding means and a part of said auxiliary winding means being initially excited to effect start-up energization of the dynamoelectric machine when said centrifugal switch means is in its first position and said relay means is in its excited condition until the dynamoelectric machine generally attains the predetermined low speed thereof; and low speed main winding means adapted for excitation to maintain the predetermined low speed energization of the dynamoelectric machine when said centrifugal switch is in its second position and said relay means is in its deexcited condition, and said parallel winding circuit combination being thereafter reexcited to effect the energization of the dynamoelectric machine at the predetermined high speed thereof when said relay means is translated to its deexcited condition in response to a preselected momentary deenergization of the dynamoelectric machine across the power source.

8. A dynamoelectric machine as set forth in claim 7 wherein said auxiliary winding means comprises a pair of winding sections serially interconnected with each other with one of said winding sections comprising said auxiliary winding means part.

9. A dynamoelectric machine as set forth in claim 7 wherein said parallel winding circuit combination starts the dynamoelectric machine as a split-phase machine and runs the dynamoelectric machine as a two phase machine during the predetermined high speed energization thereof.

10. A dynamoelectric machine as set forth in claim 7 further comprising means connected between said parallel winding circuit combination and said centrifugal switch for short circuiting said capacitor and the other part of said auxiliary winding means upon the start-up energization of the dynamoelectric machine when said centrifugal switch means is in its first position.

11. A dynamoelectric machine adapted for energization at a predetermined low speed and at a predetermined high speed across a single phase power source, the dynamoelectric machine comprising:

a low speed main winding means;

a parallel winding circuit combination including a high speed main winding means connected across a series combination of a phase shift capacitor and a pair of series connected auxiliary winding sections;

switch means responsive to dynamoelectric machine speed and movable between one position for short circuiting said capacitor and one of said auxiliary winding sections so that upon start-up energization of the dynamoelectric machine only said high speed main winding means and the other of said auxiliary winding sections are excited in parallel and another position of said switch means to terminate the start-up energization of the dynamoelectric machine generally as the dynamoelectric machine attains the predetermined low speed thereof and to effect the excitation of said low speed main winding means so as to maintain the predetermined low speed energization of the dynamoelectric machine; and relay means for operation between a pair of switching modes, said relay being disposed in one of its switching modes when said switch means is in its one and another positions and said relay means being operable in response to a preselected condition to the other of its switching modes to effect the termination of the predetermined low speed energization of the dynamoelectric machine and the excitation of said parallel winding circuit combination so as to energize the dynamoelectric machine at the predetermined high speed thereof.

12. A dynamoelectric machine adapted for energization at a predetermined low speed and a predetermined high speed across a single phase power source, the dynamoelectric machine comprising:

a pair of main windings;

a series combination of a phase-shift capacitor and a pair of auxiliary windings connected in a parallel combination with one of said main windings;

means operable generally for short circuiting one of said auxiliary windings and said phase-shift capacitor at a speed of the dynamoelectric machine below the predetermined low speed so that only the other of said auxiliary windings is excited with said one main winding in said parallel combination to effect a split phase starting mode of the dynamoelectric machine;

means operable generally as the dynamoelectric machine attains its predetermined low speed for effecting the excitation of the other of said main windings and for effecting the deexcitation of said one main winding and said other auxiliary winding so that said other main winding effects the energization of the dynamoelectric machine at the predetermined low speed thereof in a single phase mode; and means operable generally at a speed of the dynamoelectric machine less than the predetermined low and speed occasioned in the event of a preselected momentary interruption in the energization of the dynamoelectric machine across the power source for effecting the deexcitation of said other main winding and for effecting the excitation of said parallel combination so as to energize the dynamoelectric machine in a two phase mode to the predetermined high speed thereof.

13. A dynamoelectric machine adapted for selective energization at a predetermined low speed and at a predetermined high speed across a power source, the dynamoelectric machine comprising:

a low speed running winding and a high speed running winding;

centrifugal switch means operable generally for switching between a first position and a second position;

relay means adapted for operation in an energized condition and a deenergized condition;

a first auxiliary winding operative when energized in parallel with one of said low and high speed running windings to accelerate the dynamoelectric machine to at least the predetermined low speed thereof;

a second auxiliary winding;

means for connecting said first and second auxiliary windings in a series combination with each other and in a parallel combination with said high speed running winding, said parallel combination being effective when energized to accelerate the dynamoelectric machine from its predetermined low speed to its predetermined high speed;

means for placing said relay means in its energized condition when the dynamoelectric machine is initially started across the power source;

means associated with said relay means for maintaining said relay means in its energized condition after being placed therein upon the initial starting of the dynamoelectric machine across the power source when said centrifugal switch is in its first position, said centrifugal switch being operative in its second position to energize said low speed running winding;

means for disabling said placing means when said centrifugal switch is in its second position;

means operable generally in the event of the occurrence of a preselected momentary interruption of the energization of the dynamoelectric machine across the power source when said centrifugal switch is in its second position for effecting the deenergization of said relay means, said relay means being effective in its deenergized condition to deenergize said low speed running winding and to energize said parallel combination whereby the dynamoelectric machine is energized to its predetermined high speed.

* * * * *

UNITED STATES PATENT AND TRADEMARK OFFICE
CERTIFICATE OF CORRECTION

PATENT NO. : 4,388,581
DATED : June 14, 1983
INVENTOR(S) : Har S. Bhatnagar and James A. Butcher It is certified that error appears in the above—identified patent and that said Letters Patent is hereby corrected as shown below:

Title Page, Add "James A. Butcher, Worthington, Ind." as a co-inventor of this patent.

Col. 11, line 57, delete "enegization" and insert --energization--.

Col. 13, line 49, after "in" insert --a--.

Signed and Sealed this

Thirteenth Day of September 1983

[SEAL]

Attest:

GERALD J. MOSSINGHOFF

Attesting Officer     Commissioner of Patents and Trademarks